(12) United States Patent
Sumii et al.

(10) Patent No.: US 9,958,856 B2
(45) Date of Patent: May 1, 2018

(54) ROBOT, ROBOT CONTROL METHOD AND ROBOT CONTROL PROGRAM

(71) Applicant: JANOME SEWING MACHINE CO., LTD., Tokyo (JP)

(72) Inventors: Yusuke Sumii, Sagamihara (JP); Kenichiro Hiruma, Tachikawa (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 156 days.

(21) Appl. No.: 14/554,162

(22) Filed: Nov. 26, 2014

(65) Prior Publication Data
US 2015/0177730 A1 Jun. 25, 2015

(30) Foreign Application Priority Data
Dec. 20, 2013 (JP) ................................. 2013-263654

(51) Int. Cl.
*G05B 19/402* (2006.01)
*B25J 9/16* (2006.01)

(52) U.S. Cl.
CPC .......... *G05B 19/402* (2013.01); *B25J 9/1664* (2013.01); *G05B 2219/37021* (2013.01);
(Continued)

(58) Field of Classification Search
CPC ......... G05B 19/402; G05B 2219/37021; B25J 9/1664; Y02P 90/265; Y10S 901/16; Y10S 901/41
(Continued)

(56) References Cited

U.S. PATENT DOCUMENTS

| 3,244,368 A | * | 4/1966 | Juhas | G06M 1/303 235/132 R |
| 4,166,543 A | * | 9/1979 | Dahlstrom | B25J 9/1684 318/601 |

(Continued)

FOREIGN PATENT DOCUMENTS

| CN | 1150401 A | 5/1997 |
| CN | 1754665 A | 4/2006 |

(Continued)

OTHER PUBLICATIONS

Office Action dated Feb. 17, 2016 in corresponding Korean Application No. 10-2014-0137522.
(Continued)

*Primary Examiner* — Ziaul Karim
*Assistant Examiner* — Joshua Sanders
(74) *Attorney, Agent, or Firm* — Nath, Goldberg & Meyer; Jerald L. Meyer; Stanley N. Protigal (57) ABSTRACT

The robot of this embodiment moves a work tool to points where multiple work-pieces are placed, and executes a process specified at each point where the work-piece is placed. A point sequence memory stores the point where the work-piece is placed. A work-instruction-sequence memory stores a work instruction executed at the point where the work-piece is placed. A work-piece-correction-level memory stores, in association with each other, a work-piece correction level at each point and a parameter of each point where the work-piece is placed. A work-piece-correction counter memory stores a counter indicating to which point the work-piece correction level at the point is reflected.

3 Claims, 5 Drawing Sheets

(52) U.S. Cl.
CPC .......... *Y02P 90/265* (2015.11); *Y10S 901/16* (2013.01); *Y10S 901/41* (2013.01)

(58) Field of Classification Search
USPC ........................................................ 700/193
See application file for complete search history.

(56) References Cited

U.S. PATENT DOCUMENTS

| | | | |
|---|---|---|---|
| 4,594,670 A | 6/1986 | Itoh | |
| 2002/0067638 A1* | 6/2002 | Kobayashi | G11C 7/1006 365/185.01 |
| 2009/0228144 A1* | 9/2009 | Okazaki | B25J 9/1692 700/245 |
| 2011/0184544 A1* | 7/2011 | Ikushima | G05B 19/4093 700/97 |
| 2011/0234788 A1* | 9/2011 | Koike | G01B 11/25 348/95 |

FOREIGN PATENT DOCUMENTS

| | | |
|---|---|---|
| CN | 101213049 A | 7/2008 |
| CN | 101828153 A | 9/2010 |
| CN | 103056884 A | 4/2013 |
| CN | 103442661 A | 12/2013 |
| DE | 3406255 A1 | 9/1984 |
| DE | 10192991 T1 | 11/2002 |
| JP | H0623562 A * | 2/1994 |
| JP | H0623652 A | 2/1994 |
| JP | H06187021 A | 7/1994 |
| JP | H06218683 A | 8/1994 |
| JP | H0839357 A | 2/1996 |
| JP | 2004-299013 A | 10/2004 |
| JP | 2007-193846 A | 8/2007 |
| KR | 20020067893 A | 8/2002 |

OTHER PUBLICATIONS

Office Action dated Jan. 27, 2016 in corresponding Chinese Application No. 201410647517.X.
German Office Action dated Sep. 20, 2016 corresponding to application No. 102014117346.5.
Chinese Office Action dated Mar. 28, 2017 corresponding to application No. 201410647517.X.
Japanese office action dated Sep. 19, 2017 for corresponding JP application 2013-263654 with English translation attached.

* cited by examiner

| POINT WORK 1 ||
|---|---|
| 0001 | multiCamWadj |
| 0002 | |

*FIG. 3*

| WORK-PIECE CORRECTION LEVEL | PARAMETER |
|---|---|
| 10 | 1 |
| 12 | 2 |
| 11 | 3 |
| 11 | 4 |
| 12 | 5 |
| 10 | 6 |
| 10 | 7 |
| 11 | 8 |

FIG. 4

| POINT NUMBER | 1 | 2 | 3 | . . . | 9 | 10 |
|---|---|---|---|---|---|---|
| POINT KIND | PTP DRIVE POINT | PTP DRIVE POINT | PTP DRIVE POINT | | DOT PAINTING | DOT PAINTING |
| X COORDINATE[mm] | 100 | 100 | 100 | | 105 | 105 |
| Y COORDINATE[mm] | 100 | 110 | 120 | | 85 | 95 |
| Z COORDINATE[mm] | 20 | 20 | 20 | | 35 | 35 |
| POINT WORK NUMBER | 1 | 1 | 1 | | | |
| WORK-PIECE CORRECTION NUMBER | | | | | 1 | 1 |

| POINT NUMBER | 1 | 2 | 3 | ... | 9 | 10 |
|---|---|---|---|---|---|---|
| POINT KIND | PTP DRIVE POINT | PTP DRIVE POINT | PTP DRIVE POINT | | DOT PAINTING | DOT PAINTING |
| X COORDINATE[mm] | 100 | 100 | 100 | | 105 | 105 |
| Y COORDINATE[mm] | 100 | 110 | 120 | | 85 | 95 |
| Z COORDINATE[mm] | 20 | 20 | 20 | | 35 | 35 |
| POINT WORK NUMBER | 1 | 2 | 3 | | | |
| WORK-PIECE CORRECTION NUMBER | | | | | 1 | 2 |

FIG. 8

| POINT WORK 1 | |
|---|---|
| 0001 | cameraWadj 1 |
| 0002 | |

| POINT WORK 2 | |
|---|---|
| 0001 | cameraWadj 2 |
| 0002 | |

| POINT WORK 3 | |
|---|---|
| 0001 | cameraWadj 3 |
| 0002 | |

| POINT WORK 4 | |
|---|---|
| 0001 | cameraWadj 4 |
| 0002 | |

| POINT WORK 5 | |
|---|---|
| 0001 | cameraWadj 5 |
| 0002 | |

| POINT WORK 6 | |
|---|---|
| 0001 | cameraWadj 6 |
| 0002 | |

| WORK-PIECE CORRECTION | |
|---|---|
| KIND OF CAMERA | A210 |
| COMMUNICATION PORT NUMBER | 1 |
| CAMERA COORDINATE VARIABLES | UNIT COEFFICIENT, ROTATION ANGLE, X DISPLACEMENT LEVEL, Y DISPLACEMENT LEVEL |
| NUMBER OF REFERENCE MARKS | 3 |

*FIG. 10*

ROBOT, ROBOT CONTROL METHOD AND ROBOT CONTROL PROGRAM

CROSS-REFERENCE TO RELATED APPLICATIONS

This application is based upon and claims the benefit of priority from Japan Patent Application No. 2013-263654, filed on Dec. 20, 2013, the entire contents of which are incorporated herein by reference.

BACKGROUND OF THE INVENTION

Field of the Invention

The present disclosure relates to a robot control method for executing multiple stored work instructions at a predetermined position generally called a point, a robot utilizing the same, and an operating setting program for controlling the operation of the robot.

Description of the Related Art

In general, according to programs for controlling the operation of a robot, an instruction-based method to the robot for causing the robot to execute an arbitrary operation, and a process-based method at a point where the robot is actuated are known. According to a process-based robot at a point, the robot is caused to execute an arbitrary process at a predetermined position called a point.

In the process-based robot at a point, in order to execute a certain process at a given point, an image of the position of a work-piece that is a process target is picked up before executing the process, a correction position of the work-piece is calculated based on the picked-up image, and the process is executed at a correction position. Such processes are commonly applied. Example certain processes are painting to the work-piece, screwing, and soldering.

In order to execute the process at the correction position, first, an image of the position of the work-piece is picked up to calculate a position correcting level (displacement). Next, it is necessary to set, for each point where a work is performed, coordinates of a point, a work instruction at this point, and a "work-piece correction" to calculate the correction position of the work-piece based on the calculated position correcting level (displacement).

The "work-piece correction" for calculating the correction position of the work-piece needs pieces of information, such as the kind of a camera to pickup the image of the work-piece, the communication port number, the coordinate variables of the camera, and the number of reference markings on the work-piece picked up by the camera. When the correction is performed at each point, it is necessary to set the "work-piece correction" for each point. Next, when the work instruction is executed, the "work-piece correction" corresponding to each point is read to calculate the correction position, and a work is executed at the calculated correction position.

CITATION LIST

Patent Literatures

Patent Document 1: JP 2007-193846 A

Figure 7:
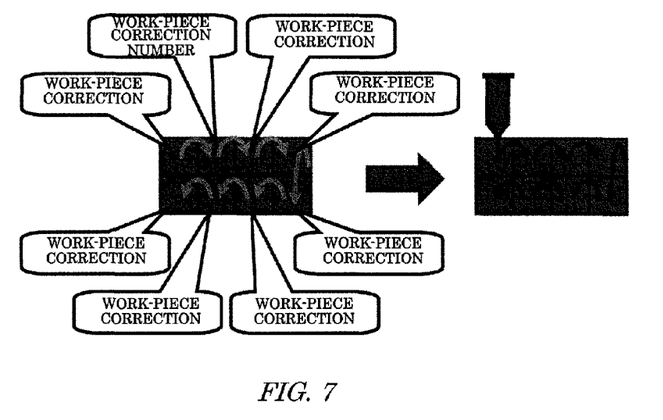
FIG. 7 is a diagram illustrating a work by a conventional robot.

According to such robots, as illustrated in FIG. 7, when a correction is performed on multiple work-pieces to execute the work process, it is necessary to set the work-piece correction at each point, and thus it is necessary to set the following (a) to (d) items.

(a) Set X, Y, and Z coordinates of points 1 to 8 where the camera is moved to pick up the image of the work-piece.

(b) Set "cameraWadj 1" to "cameraWadj 8" commands as "point works" to be executed at the respective points 1 to 8. A "cameraWadj n" is a work instruction sequence "to transmit an image-pickup command to the camera through a communication line, to analyze a return of the positional coordinates of the mark upon image-pickup through the communication line, and to store the calculated position correction level in a "work-piece correction n"".

(c) In order to execute a dot painting work as a work process for the placed work-piece, set "dot painting" as a "point kind" of points 9 to 16. The coordinates of the points 9 to 16 are shifted from the coordinates of the points 1 to 8 by what corresponds to a difference between the position of the camera for work image-pickup fixed to a work tool and the position of a painting device.

(d) Set "work-piece correction 1" to "work-piece correction 8" when the "dot painting" is performed at the points 9 to 16.

Upon setting of the above-explained (a) to (d), when the dot painting as the work process at the points 9 to 16 is performed, the "work-piece corrections 9 to 16" are read to calculate the correction position of the work-piece, and the work is executed at the calculated correction position. Hence, the dot painting work at the points 9 to 16 can be executed at the correction positions of the work-piece reflecting the work-piece correction level obtained upon image-pickup at the points 1 to 8.

Figure 8:
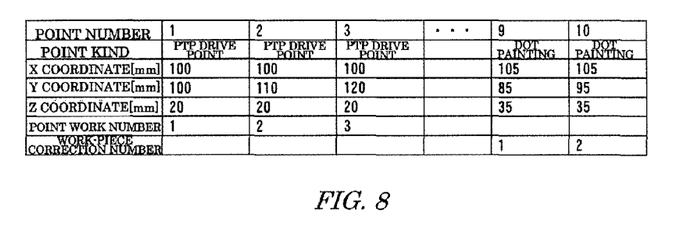
FIG. 8 is a diagram illustrating a point work instruction sequence in a conventional robot.
Figure 9:
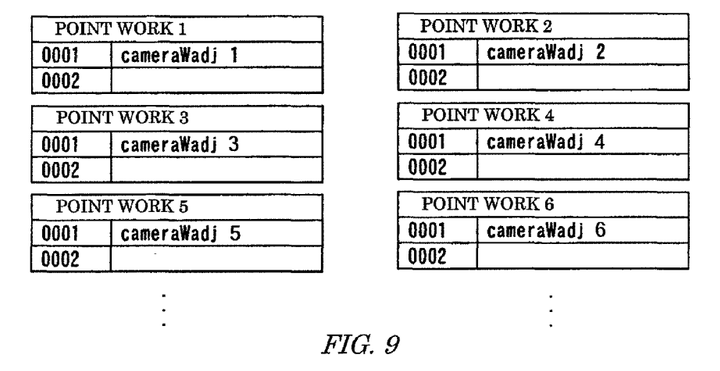
FIG. 9 is a diagram illustrating a work-piece correction by a conventional robot.

In this case, as illustrated in FIG. 8, when the "work-piece correction" is executed at the points 9 to 16, "cameraWadj 1", "cameraWadj 2", and "cameraWadj 3" are set as the respective point works at the points 1, 2, and 3. As the point works set in the points 1 to 8, as illustrated in FIG. 9, the point work numbers corresponding to the "cameraWadj 1" to "cameraWadj 8" are set, and the setting may be made with such a number, but as illustrated in FIG. 8, it is necessary to set the "cameraWadj 1" to "cameraWadj 8" in the respective points 1 to 8.

Figure 10:
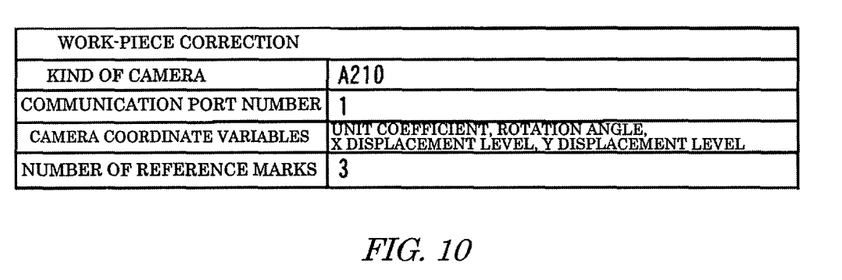
FIG. 10 is a diagram illustrating a point work sequence in a conventional robot.

The "work-piece correction n" that stores the position correction level calculated at the "cameraWadj n" stores, in addition to the position correction level, as illustrated in FIG. 10, data on the kind of the camera, the communication port number, the camera coordinate variables, and the number of reference markings. That is, when eight work-pieces are placed, eight work sequences to execute the "work-piece correction" are necessary, and the number of pieces of necessary data on the "work-piece correction" is eight. Accordingly, when the number of work-pieces increases, and the number of points increases, the setting of a work sequence to execute the "work-piece correction" for each point becomes complex, and a large memory area to store data on the "work-piece correction" becomes necessary.

Conversely, when there are multiple work-pieces, and a "distance between a work-piece and another work-piece" is shorter than a "distance between the camera and a work tool", and when image-pickup by the camera is sequentially performed on the successive work-pieces, the whole work becomes short. In such a case, since the images of the work-pieces are picked up by one camera, the pieces of information, such as the kind of the camera for the work-piece correction, the communication port number, the camera coordinate variables, and the number of reference markings on the work-piece to be picked up by the camera duplicate in the "work-piece correction".

The present disclosure has been proposed to address the aforementioned problems of the conventional technologies, and in a "work-piece correction" at each point, the common contents of the "work-piece correction" at each point like a camera setting when a correction level is calculated from an image-pickup result of a work-piece by one camera are separately stored from the correction level calculated from the image-pickup result. Hence, it becomes possible to reduce the data quantity of the "work-piece correction" and to execute a teaching work through a simple procedure.

SUMMARY OF THE INVENTION

To accomplish the above objective, a robot according to an aspect of the present disclosure moves a work tool to points where a plurality of work-pieces are placed and executes a specified process at the point where each work-piece is placed, and, the robot includes: a point sequence memory storing the point where the work tool is moved; a work-instruction-sequence memory storing a work instruction causing the work tool to execute a work; a work-piece-correction-level memory storing, in association with each other, a work-piece correction level at each point and a parameter of the each point; and a work-piece-correction counter memory storing a value of a counter to be reflected on the parameter.

In addition, a robot control method and a robot control program are also aspects of the present disclosure.

DETAILED DESCRIPTION OF THE PREFERRED EMBODIMENTS

A robot according to an embodiment of the present disclosure will be explained below in detail with reference to the accompanying drawings. In the embodiment, the duplicated explanation for the drawings will be omitted.

1. First Embodiment

Figure 1:
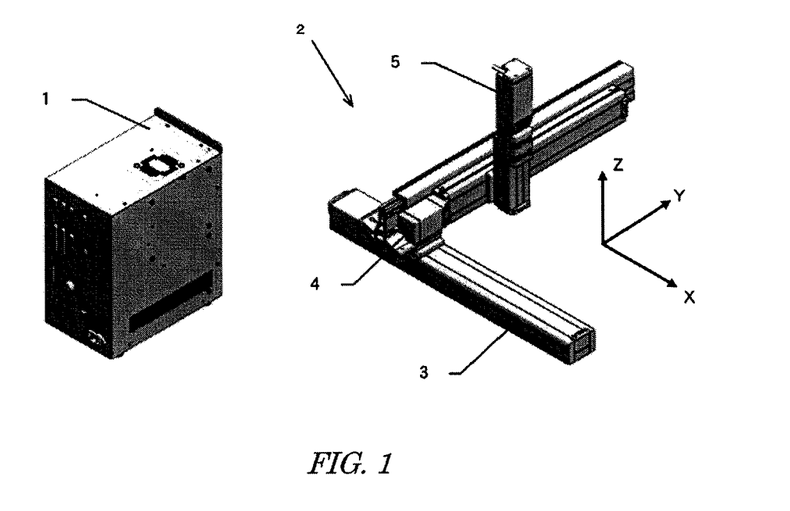
FIG. 1 is a perspective view illustrating a whole structure of a robot according to a first embodiment of the present disclosure.

FIG. 1 is a diagram illustrating a whole structure of a robot according to this embodiment. The robot of this embodiment mainly includes two portions as illustrated in FIG. 1. The one is a controller 1, and the other is a main body 2. The main body 2 includes an X slider 3 movable in the X direction, a Y slider 4 mounted on a portion movable in the X direction, and a Z slider 5 attached to a portion movable in the Y direction. A work tool 30 (unillustrated) is attached to a portion of the Z slider 5 movable in the Z direction. Each slider is actuated by a motor, and when the motor is driven in accordance with an instruction from the controller 1, the work tool can be moved in the X, Y, and Z directions.

According to the robot of this embodiment, when a work process is performed while applying a correction to multiple work-pieces placed on respective positions that are points 1 to 8, it is necessary to set the following (a) to (d) items.

(a) Set X, Y, and Z coordinates of the respective points 1 to 8 where a camera to pick up an image of the work-piece is moved.

(b) Set "multiCamWadj 1" as a "point work" performed at the points 1 to 8.

(c) Set, for example, a "dot painting" as a "point work" performed at points 9 to 16. The coordinates of the points 9 to 16 are positions shifted from the coordinates of the points 1 to 8 by what corresponds to the difference between the camera position for work-piece image-pickup fixed to the work tool and the position of a painting device.

(d) Set a "work-piece correction 1" when the "dot painting" is performed at the points 9 to 16.

When the above (a) to (d) are set, the correction level to the work-pieces placed at the points 1 to 8 where the work-pieces are placed is picked up, and the dot painting can be carried out while reflecting the correction level.

According to such a robot control, the work tool 30 is moved in the order of points set through a teaching, and the work tool 30 is caused to execute the work content defined by a point kind in each point at the correction position corresponding to each point. Example work tools 30 applicable are the painting device for painting, a screw tightening device to tighten a screw, and a solder device for soldering.

[1-1. Structure]

Figure 2:
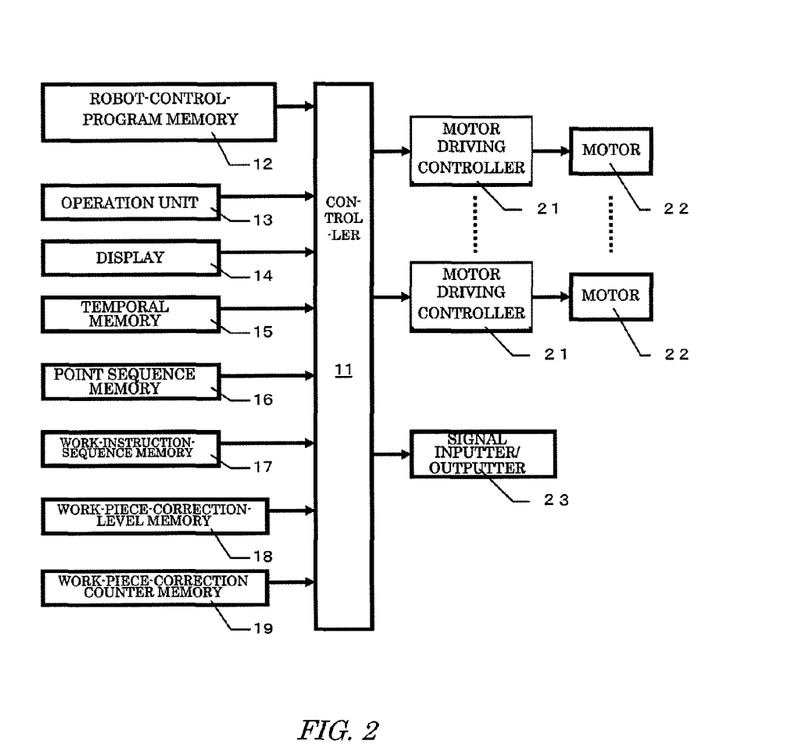
FIG. 2 is a functional block diagram according to the first embodiment of the present disclosure.

A control device 10 is present in the controller 1. FIG. 2 is a functional block diagram of the control device 10. In FIG. 2, a controller (CPU) 11 mainly including a microcomputer controls the whole robot. The CPU 11 executes an inputting operation, a displaying, a storing, a motor driving, and a signal input or signal output in accordance with a control program stored in a robot-control-program memory 12. The robot includes an operation unit 13, a display 14, a temporal memory 15, a point sequence memory 16, a work-instruction-sequence memory 17, a work-piece-correction-level memory 18, a work-piece-correction-counter memory 19, and a motor driving controller 21. The temporal memory 5 is utilized for such a control operation.

The controller 11 mainly includes a microcomputer. The controller 11 outputs an instruction to the motor driving controller 21 to drive the motor 22, thereby executing various operations. The necessary arbitrary number of the motor driving controllers 21 and the motors 22 are provided, and the motor 22 is connected to the work tool 30 that executes a work and an operation by the power from the motor 22. For example, in the case of a screw tightening unit, a control is performed by four motors that are an X-axis-direction moving motor, a Y-axis-direction moving motor, a Z-axis-direction moving motor to move the screw tightening unit to a predetermined point, and a screw tightening motor to rotate a screw tightening tool. In addition, the controller 11 outputs an instruction to the signal inputter/outputter 23 to perform a signal input from the exterior or a signal output thereto. A signal input from the exterior is reflected on a control for the robot, and a signal is output to the exterior to control an external device based on that signal.

The operation unit 13 includes an input device like a keyboard and a hardware resource or a software resource for teaching, and allows an inputting of a program for the robot and data thereof. In addition, the display 13 is, for example, an LCD display device, and displays a set value and an input status through the operation unit 13.

The temporal memory 15 is a so-called memory, and is a memory area that temporarily stores necessary information when the controller 11 outputs a control instruction.

The point-sequence memory 16 stores a point where the unit 30 is moved, and a work instruction sequence for allowing the work tool to execute a work at that point. In addition, the point-sequence memory 16 includes a memory area to store a correction level to the work tool at that point. In the case of a point-based robot, based on the content of a teaching stored in the point-sequence memory 16, the unit is controlled. A point where the unit is controlled is allocated with a point number, and the robot executes an instruction at the points in the order of a smaller point number. The point where the robot executes a work is stored as, for example, X, Y, and Z coordinates. A work is executed with a correction level stored in the point-sequence memory 16 being reflected.

The work-instruction-sequence memory 17 stores, as a point work number, a number indicating a work instruction to cause the work tool 30 to execute a work. The work instruction is an instruction to order a work operation to the robot, and such an instruction includes various works, such as a screw tightening, painting, and a soldering. As to the work instruction, the work instruction executed at multiple timings, such as before the work tool 30 is moved to the point, while the tool is moving to the point, and after the tool reaches the point is set and stored. The work instruction may be associated with a number and stored. The following is an example case.

Figure 3:
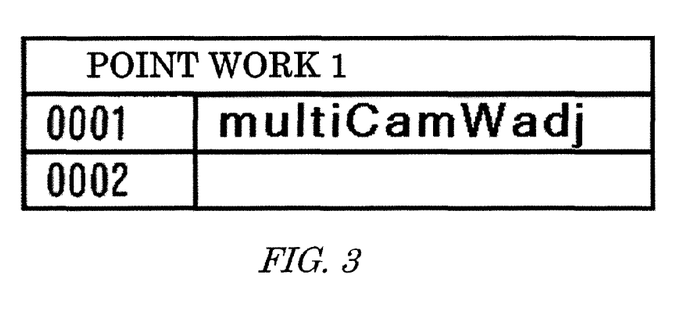
FIG. 3 is a diagram illustrating a point work instruction sequence according to the first embodiment of the present disclosure.

As illustrated in FIG. 3, a "point work number 1" is "multiCamWadj". The "multiCamWadj" transmits an image-pickup command to the camera to pick up an image of a work-piece correction level placed on each point through a communication line. Next, a returned positional coordinate of a marking as a result of an image-pickup through the communication line is analyzed, and a work to store a calculated position correction level in an area corresponding to the work-piece at each point is stored.

As a "point work number 3", a work of picking up a screw from a feeder before it is moved to each point is stored. In this case, a feeder screw-pickup work is separately stored as a work instruction.

As a "point work number 5", for example, a work to start a screw tightening driver 0.1 second before reaching each point is stored as a specified work to be executed while moving to each point.

As a "point work number 10", a work of checking a completion signal by a screw tightening driver through an actual screw tightening work and descending it in the Z axis at a screw tightening speed is stored.

Figure 4:
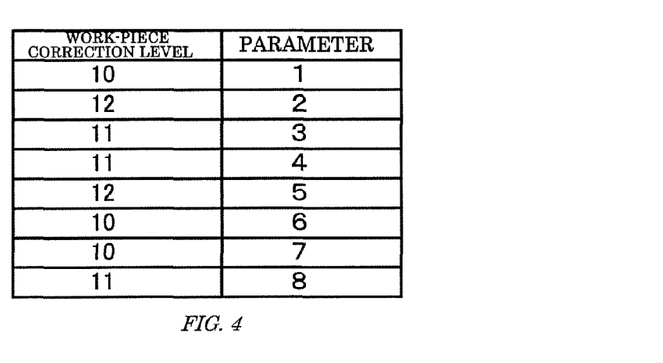
FIG. 4 is a diagram illustrating a relationship between a work-piece correction level and a parameter stored in a work-piece-correction-level memory according to the first embodiment of the present disclosure.

The work-piece-correction-level memory 18 stores a work-piece correction level. As illustrated in FIG. 4, the work-piece correction level is a work-piece-correction-level array that is a combination of a work-piece correction level and a parameter based on the value of a counter. In order to store the work-piece correction level, the work-piece correction level is calculated through an image-pickup result by the camera based on the work instruction at a point which is "multiCamWadj", and a work-piece correction level number is obtained as the parameter. For example, "multiCamWadj 1" is an instruction of "transmitting an image-pickup command to the camera through the communication line relative to the first work-piece, analyzing a returned positional coordinate of the marking as a result of an image-pickup through the communication line, and storing a calculated position correction level in a work-piece-correction-level array indicated by a current counter for the first work-piece correction".

For example, as illustrated in FIG. 4, an image of the work of the first work-piece is picked up, and a correction level X=10 is calculated. This correction level X=10 and a parameter "1" obtained from a current counter value "1" are combined and stored as the work-piece-correction-level array. Next, an image of the work of the second work-piece is picked up, and the correction level X=12 is calculated. This correction level X=12 and a parameter "2" obtained from the current counter value "2" are combined and stored as a work-piece-correction-level array. As explained above, this instruction takes the work-piece correction number as a parameter, but the counter value is internally retained, and is not demonstratively specified as a parameter. That is, a counter value at the time of image-pickup is stored in the work-piece-correction counter memory 19, the picked-up position correction level is stored together with the counter value stored in the work-piece-correction counter memory 19, and the work-piece-correction counter memory 19 increments the stored counter value by 1. For the image-pickup point of the camera, the same point work can be applied at all.

The work-piece-correction counter memory 19 stores a reading counter likewise the image-pickup counter. As to the reading counter, the counter may be demonstratively incremented through an instruction like "incMultiCamWadj", and an increment can be automatically performed in accordance with a reading. According to this way of application, in general, once all image-pickup is performed, a work at the correction position is executed. Hence, the "image-pickup counter" and the "reading counter" may have a common counter, i.e., it is fine if there is only one counter. Resetting (clear out) of the counter may be automatically performed at first when the program is run, or may be demonstratively performed through an instruction like "clrMultiCamWadj" (resetting both counters).

[1-2. Operation]

According to this embodiment, for a work-piece correction, multiple work-piece correction levels are stored, and a counter is provided, which specifies which work-piece correction level (storage area) is utilized in an image-pickup and in an operation, and the image-pickup by the camera and the actual work are performed while controlling this counter. This facilitates a teaching.

Figure 5:
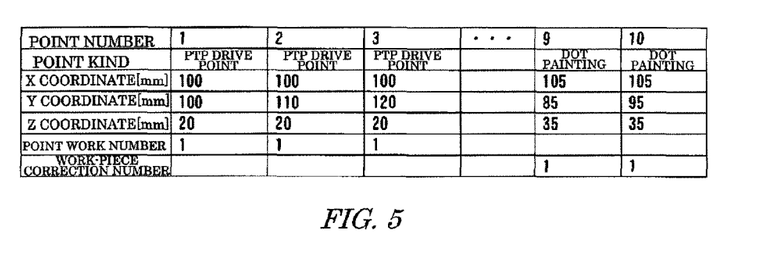
FIG. 5 is a diagram illustrating a point work instruction sequence according to the first embodiment of the present disclosure.

In the robot of this embodiment, when a work process is performed while correcting the multiple work-pieces placed at the positions of the points 1 to 8, as illustrated in FIG. 5, it is necessary to set the following items (a) to (d).

(a) Set X, Y, and Z coordinates of the points 1 to 8 where the camera to pick up an image of the work-piece is moved.

(b) Set, as a "point work" performed at the points 1 to 8, for example, "multiCamWadj 1".

(C) Set, as a "point work" performed at points 9 to 16, for example, "dot painting". The coordinates of the points 9 to 16 are shifted from the coordinates of the points 1 to 8, respectively, by what corresponds to a difference between the position of the camera for work-piece image-pickup fixed to the work tool and the position of the painting device.

(d) Set a "work-piece correction 1" when the "dot painting" is performed at the points 9 to 16.

When the above-explained (a) to (d) are set, the correction level is calculated through the image-pickup results at the points 1 to 8, and the dot painting reflecting the correction level is executed.

As illustrated in FIG. 5, when a dot painting is performed to eight work-pieces placed at eight locations, first, the X, Y, and Z coordinates of the point numbers 1 to 16 are set. The coordinates of the points 1 to 8 in FIG. 5 are the positions of the camera where images of the placed eight work-pieces can be appropriately picked up to calculate a position correction level (displacement). The points 9 to 16 are positions of the painting device when a painting work is performed on the placed eight work-pieces. Meanwhile, the coordinates of the points 1 to 8 and those of the points 9 to 16 are shifted by what corresponds to a difference between the position of the work-piece image-pickup camera fixed to the work tool and the position of the painting device.

In FIG. 5, the position of the point 1 where the camera is moved is indicated as (100, 100, 20) in the (X, Y, Z) coordinates, the position of the point 2 is indicated as (100, 110, 20) in the (X, Y, Z) coordinates, and the position of the point 3 is indicated as (100, 120, 20) in the (X, Y, Z) coordinates. When the eight work-pieces are placed, in the points 1 to 8 to pick up images of the eight work-pieces by the camera, coordinates at respective points are set.

Figure 6:
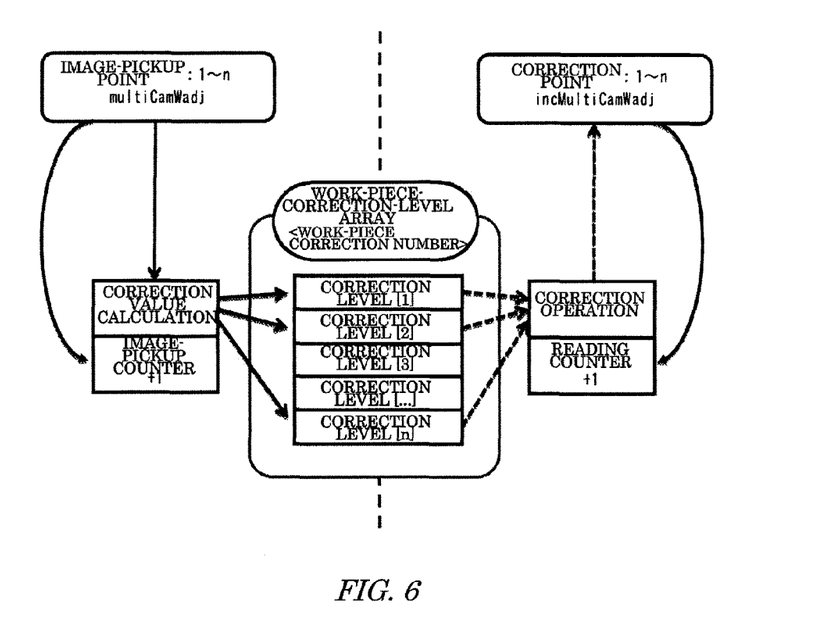
FIG. 6 is a diagram illustrating a correction to multiple work-pieces according to the first embodiment of the present disclosure.

Next, as the "point work" executed at the points 1 to 8, "multiCamWadj 1" is set. The "multiCamWadj 1" indicates a point work of "transmitting an image-pickup command to the camera with respect to the first work-piece through the communication line, analyzing a returned positional coordinates of the marking as a result of the image-pickup through the communication line, and storing the calculated position correction level in the work-piece-correction-level array indicated by the current counter of the first work-piece correction". As illustrated in FIG. 6, this is a command of "storing the correction level of the picked-up position together with the counter value stored in the work-piece-correction counter memory, and causing the work-piece-correction counter memory to increment the stored counter value by 1". That is, the correction level to the first work-piece is stored in the work-piece-correction array together with the parameter "1" based on the counter value "1". Next, with respect to the second work-piece, the image-pickup command is transmitted to the camera through the communication line, a returned positional coordinates of the marking as a result of the image-pickup through the communication line is analyzed, and the calculated position correction level is stored in the work-piece-correction-level array indicated by the current counter of the second work-piece correction. This work is performed up to the eighth work-piece, and the correction levels to the first to the eighth work-pieces are stored in the work-piece-correction-level array together with respective parameters "1" to "8" based on the counter values "1" to "8".

Next, as the "point work" executed at the points 9 to 16, for example, a "dot painting" is set. As to the setting of the "point work", a dot painting is set as the "point kind". According to this embodiment, the position of the camera for the work-piece image-pickup fixed to the work tool and the position of the painting device are shifted by (5, −15, 15) in the (X, Y, Z) coordinate calculation. Hence, the position of the point 8 where the painting device is moved is set to be (105, 85, 35) in the (X, Y, Z) coordinates, and the position of the point 10 where the painting device is moved is set to be (105, 95, 35) in the (X, Y, Z) coordinates. The coordinates of the points 11 to 16 where the painting device is moved are set likewise.

Next, a "work-piece correction 1" when the "dot painting" is executed at the points 9 to 16 is set. The "work-piece correction 1" reads the work-piece correction level stored in the work-piece-correction-level array through the "multiCamWadj 1". According to the "multiCamWadj 1", the correction levels from the point 1 to the point 8 in this order are detected, and such correction levels are stored in the work-piece-correction-level array together with the parameters "1" to "8", respectively. According to the "work-piece correction 1", the correction level of the parameter "1" is read, and the painting work reflecting such a correction level is executed. After the painting work ends, the process is shifted to the next point, the correction level of the parameter "2" is read, and the painting work reflecting this correction level is executed. Such operations are performed for the points 9 to 16, respectively.

[1-3. Advantageous Effect]

According to such a teaching of the robot of this embodiment, when a camera image-pickup is sequentially performed on a large amount of work-pieces by a camera, it is unnecessary to redundantly store, as the "work-piece correction", information, such as the kind of the camera, the communication port number, the coordinate variables of the camera, and the number of reference markings on the work-piece subjected to the image-pickup by the camera, all utilized for a work-piece correction. Hence, the data quantity of the "work-piece correction" can be reduced.

According to this embodiment, the work-piece-correction counter is provided which increments the counter value by 1 whenever the work-piece correction level is stored in the work-piece correction memory 18, and which increments the counter value by 1 whenever the work-piece correction level is read from the work-piece-correction memory 18. Hence, even if the number of work-pieces increases, and the number of points increases, only one setting of the work sequence permits an execution of the "work-piece correction" for each point. Hence, the setting of the work sequence does not become complex. In addition, the memory area to store data on the "work-piece correction" can be sufficient by what corresponds to the work-piece correction only. Therefore, the data quantity can be reduced.

Still further, according to this embodiment, there is means to set the counter value stored in the work-piece-correction counter memory 19 to be zero. Hence, when a work is intermitted or interrupted, the counter value can be set to be zero. Therefore, a start-over of the calculation of the work-piece correction level is easy.

2. Other Embodiments

The embodiment of the present disclosure was explained above, but the present disclosure permits various omissions, replacements and modifications without departing from the scope of the present disclosure. Such embodiments and modified examples thereof are within the scope and spirit of the present disclosure, and also within the appended claims and the equivalent range thereto.

What is claimed is:

1. A robot which moves a work tool to points where a plurality of work-pieces are placed and which executes a specified process at the point where each work-piece is placed, the robot comprising:

a point sequence memory storing the point where the work tool is moved;

a work-instruction-sequence memory storing a work instruction causing the work tool to execute a work;

a camera detecting a work-piece correction level at each point before executing the work instruction;

a work-piece-correction-level memory storing, in association with each other, the work-piece correction level at each point detected by the camera and a parameter of the each point;

a work-piece-correction counter memory storing a value of a counter to be reflected on the parameter; and a control device reading out the work-piece correction level at the points from the work-piece-correction-level memory, when the work tool reads out each point and a work instruction sequence at each point from the point sequence memory, wherein the control device, at each point, moves the work tool based on the work-piece correction level, and executes the work instruction, and wherein the work-piece-correction counter memory increments the counter value by 1 whenever the work-piece correction level is stored in the work-piece-correction-level memory, and increments the counter value by 1 whenever the work-piece correction level is read from the work-piece-correction-level memory.

2. A control method for a robot which moves a work tool to points where a plurality of work-pieces are placed and which executes a specified process at the point where each work-piece is placed, the method comprising:

a point sequence storing step for storing the point where the work tool is moved;

a work instruction storing step for storing a work instruction causing the work tool to execute a work;

a work-piece-correction-level detecting step for detecting, by a camera, a work-piece correction level at each point before executing the work instruction;

a work-piece-correction-level storing step for storing, in association with each other, a work-piece correction level at each point detected by the camera and a parameter of the each point;

a work-piece-correction-level reading step for reading out, by a control device, the work-piece correction level at the points from the work-piece-correction-level memory, when the work tool reads out each point and a work instruction sequence at each point from the point sequence memory;

a work-piece-correction counter storing step for storing a value of a counter to be reflected on the parameter, incrementing the counter value by 1 whenever the work-piece correction level is stored, and incrementing the counter value by 1 whenever the work-piece correction level is read out; and a control step for reading out the work-piece correction level at the points from the work-piece-correction-level memory, when the work tool reads out each point and a work instruction sequence at each point from the point sequence memory, wherein the control step, at each point, moves the work tool based on the work-piece correction level, and executes the work instruction.

3. A computer program product executing a control program for a robot which moves a work tool to points where a plurality of work-pieces are placed and which executes a specified process at the point where each work-piece is placed, comprising a non-transitory computer-readable medium to cause a computer controlling the robot to execute:

a point sequence storing step for storing the point where the work tool is moved;

a work instruction storing step for storing a work instruction executed at the point where the work-piece is placed;

a work-piece-correction-level detecting step for detecting, by a camera, a work-piece correction level at each point before executing the work instruction;

a work-piece-correction-level storing step for storing, in association with each other, a work-piece correction level at each point detected by the camera and a parameter of the each point where the work-piece is placed;

a work-piece-correction-level reading step for reading out, by a control device, the work-piece correction level at the points from the work-piece-correction-level memory, when the work tool reads out each point and a work instruction sequence at each point from the point sequence memory;

a work-piece-correction counter storing step for storing a value of a counter to be reflected on the parameter, incrementing the counter value by 1 whenever the work-piece correction level is stored, and incrementing the counter value by 1 whenever the work-piece correction level is read out; and a control step for reading out the work-piece correction level at the points from the work-piece-correction-level memory, when the work tool reads out each point and a work instruction sequence at each point from the point sequence memory, wherein the control step, at each point, moves the work tool based on the work-piece correction level, and executes the work instruction.

\* \* \* \* \*